Feb. 25, 1936.  C. H. CUNO  2,031,935
FILTER
Filed April 21, 1933  2 Sheets-Sheet 1
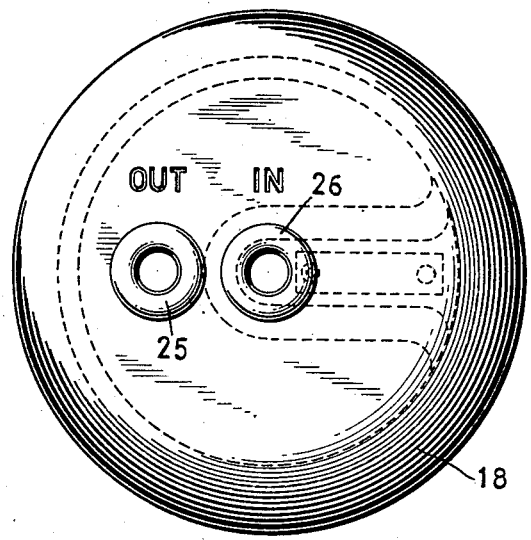
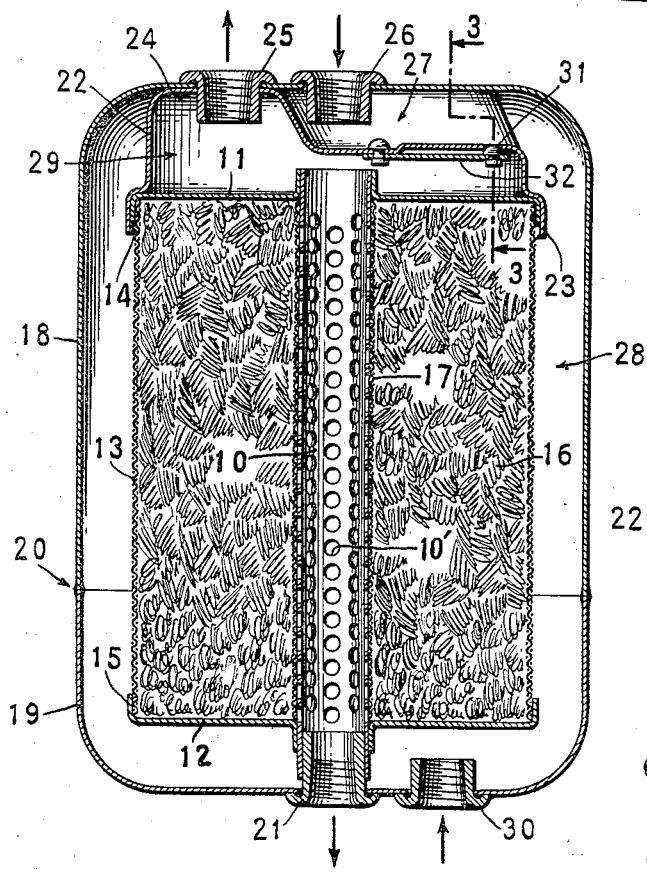
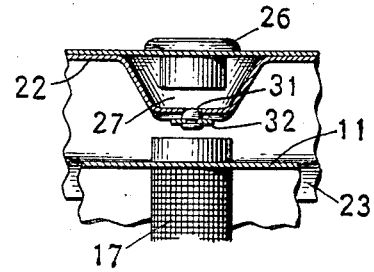
INVENTOR
CHARLES H. CUNO,
BY
ATTORNEY Feb. 25, 1936.   C. H. CUNO   2,031,935
FILTER
Filed April 21, 1933   2 Sheets-Sheet 2
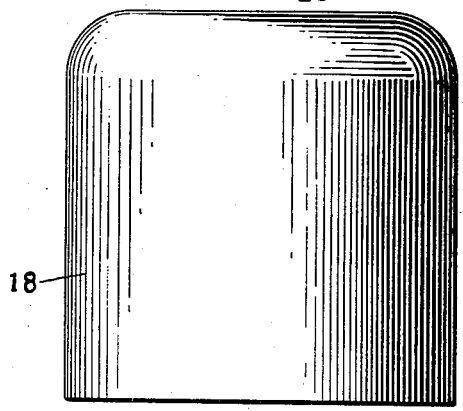
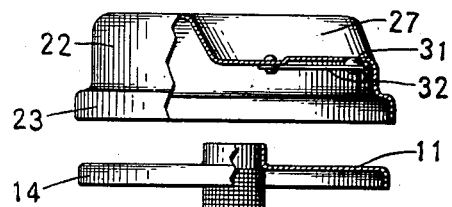
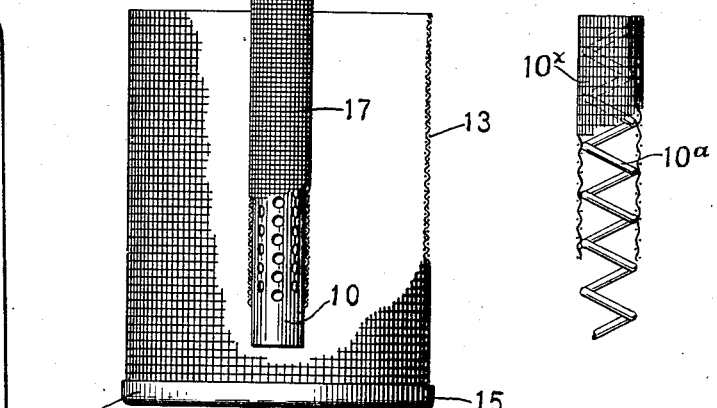
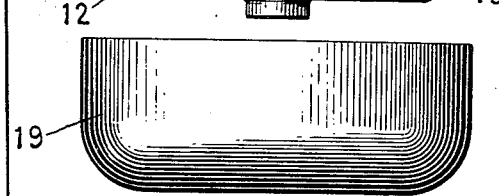
INVENTOR
CHARLES H. CUNO,
ATTORNEY Patented Feb. 25, 1936

2,031,935

UNITED STATES PATENT OFFICE 2,031,935

FILTER

Charles H. Cuno, Meriden, Conn., assignor to The Cuno Engineering Corporation, Meriden, Conn., a corporation of Connecticut Application April 21, 1933, Serial No. 667,146

4 Claims. (Cl. 210—131)

My invention relates particularly to devices adapted to be used for filtering oil.

One object of the invention is to provide an effective and compact construction which can be made cheaply.

Another object is to provide a filter which can be readily installed in many different ways.

Another object is to provide a construction of great strength and durability.

Another object is to provide effective filtration in a comparatively small device.

Another object is to provide a filter which can be mounted or installed in any position.

Another object is to provide a construction which will operate successfully under all temperature conditions customarily met with in practice.

Another object is to provide an economical and compact filter which can be readily installed by any mechanic in a motor vehicle or boat.

Another object is to provide a simplified construction which will automatically by-pass oil in case the filtering areas become clogged.

Another object is to provide a compact but effective construction which is very light in weight and yet strong and durable.

Another object is to provide a construction such that the strength of the joints between the parts of the housing and between the housing and the connections approaches that of the metals from which they are made.

Another object is to provide a construction such as to eliminate the necessity for the use of a sealing material such as solder where the inlet and outlet connections are jointed to the housing and the parts of the housing to each other, thus preventing leakage which commonly occurs through failure of such sealing material in service.

In carrying out the invention in its preferred form the filter case or shell is formed of two sheet metal cup-like members which are connected at their open edges, preferably by electric welding. Inside the shell is mounted the filtering cartridge which is supported from the opposite ends of the shell preferably by connections or nipples for the oil pipes, said connections or nipples being preferably welded in place. This cartridge consists of inner and outer foraminous members connected by end pieces and with the space in between filled by a suitable filtering material. The sides and ends of the cartridge are spaced apart from the walls of the shell so as to leave an inlet chamber surrounding the filtering cartridge. One or more additional nipples for connection to the liquid pipes are secured or welded to the shell. The cartridge and shell are constructed in such a manner as to permit them to be readily assembled and permanently secured in their proper relative positions by the act of securing the two parts of the shell together.

Fig. 1 is an end view of the preferred form of construction.

Fig. 2 is a longitudinal sectional view.

Fig. 3 is a fragmentary sectional view on the plane of the line 3—3 of Fig. 2.

Fig. 4 is an exploded view showing the various parts of the filter construction.

Fig. 5 is a sectional view of a modification of a detail.

The filtering cartridge has a central tubular member 10 formed, for instance, of sheet metal rolled into a tube and provided with perforations 10'. End plates 11 and 12 are secured to the ends of the tube, preferably by welding. The outer wall 13 of the cartridge is formed of a sheet of woven wire mesh or perforated sheet metal supported between the flanges 14 and 15 of the end plates.

The space between the inner tubular member 10 and the outer tubular member 13 is filled with a suitable filtering material 16, such as asbestos, steel wool, slag or mineral wool, glass wool, or combinations of such materials with or without granular material such as limestone, diatomaceous earth, or other materials commonly employed for filtering purposes and suitable for the particular type of liquid to be filtered.

In some cases it may be desirable to employ a fine mesh wire screen 17 around the inner tubular member 10, or the central tubular member $10^x$ may be made of suitable fine wire mesh and reinforced by an internal support in the form of a coil spring $10^a$. The tubular member, however, should have sufficient strength to sustain the weight of the filtering cartridge and to resist the liquid pressure of the system.

The outer shell or casing consists of the two sheet metal cups 18 and 19 which are connected together at 20, preferably by electric welding. The lower end of the filtering cartridge is supported laterally by the inner end of a nipple or connection 21 which is secured to the lower head of the shell, for instance, by electric welding. The sheet metal hood 22 has a flange 23 which surrounds the upper end of the filtering cartridge and preferably has its upper wall 24 secured to the shell and has an opening in its upper wall to receive the connecting nipple 25, which wall is secured, for instance, by welding to the upper end of the shell.

An additional connection 26 is similarly secured or welded to the upper end of the shell and communicates with a grooved portion 27 in the hood. The filtering cartridge is thus held in position in the assembled shell completely surrounded by an inlet chamber 28, while the outlet chamber 29 communicates with the inside of the tubular member 10.

An additional connection 30 is also preferably provided eccentrically of the cartridge so that the chamber 28 has a central inlet 26 and a lateral inlet 30. Similarly there is a centrally located outlet connection or nipple 21 and a lateral outlet 25. Of course, there will always be an inlet and an outlet in use and the other two connections may or may not be used, depending upon the installation. Any connection which is not in use will, of course, be plugged up. The single inlet 26 may be used and both of the outlets 21 and 25 may be used, for instance, to convey liquid to two discharge ports or for the attachment of a pressure gauge or an indicator or pressure gauge may be attached to one of the outside. Similarly the two inlets might both be used at the same time for the introduction of liquid or one of the inlets might be used for the attachment of an indicator or pressure gauge. The duplication of the inlets and outlets also makes it possible to readily clean both the inlet chamber and the outlet chamber without passing liquid through the filtering material.

I have also provided a by-pass between the inlet chamber and the outlet chamber to permit liquid to pass directly from one to the other in case of an abnormal pressure or in case the filter becomes clogged so as to unduly slow up the passage of oil through the filtering material. This by-pass consists of an opening 31 in the hood and a spring-pressed valve member 32 which normally closes the opening. When the pressure in the inlet chamber exceeds the pressure of the spring, this valve opens and allows the liquid to pass directly from the inlet chamber to the outlet chamber.

In manufacturing the filter the parts of the cartridge are first assembled as a unit. The connections 21, 30, 26, and 25 are then secured to the ends of the separate parts of the shell. If the hood is to be secured to the upper end of the shell it will be preferably attached after the connection 26 has been secured in place and it may be welded to the hood by the usual spot welding methods or simultaneously with the attachment of the connection 25. The hood, however, may be attached directly to the upper end of the cartridge and assembled with it into the shell, being positioned by the inner end of the connection 25.

The lower connection 21 is made long enough so as to telescope or slide in the lower end of the tube 10. This makes it possible to loosely assemble the cartridge and the lower part of the shell into the upper part of the shell and then perform the necessary welding operation for connecting the two edges of the upper part 18 and the lower part 19. In some cases it may be desirable to insulate the cartridge electrically from the shell so as to facilitate the electric welding of the parts of the shell.

When the union between the edges of the shell parts is effected, the parts are all held securely together although they are capable of considerable yielding to allow for vibration and for expansion and contraction due to changes in temperature. This is particularly desirable in view of the fact that the filter is frequently installed beneath the hood of a car and close to the engine where it is subject to the heat from the engine as well as from the heated oil.

Such a construction can be readily made by economical factory methods. It is strong but light and compact and has the advantages incident to these features. At the same time the construction is strong, durable and efficient. The provision of the multiple inlets and multiple outlets makes the device universally interchangeable in various systems with ease and speed of installation and removal.

The shell or casing being preferably of comparatively soft steel is capable of withstanding hard knocks without fracture.

The completed shell having its parts united autogenously is in effect seamless and has no joints likely to open up and leak. As no solder is required there is practically no likelihood of the parts becoming disconnected by heat.

I claim:

1. A filter comprising a sheet metal shell, a sheet metal hood secured substantially contiguous an end portion of the shell and of less width than the shell, a cartridge having end caps and supported at at least one end by said hood, inlet and outlet passages in the end of said shell adjacent the hood, one of said passages extending through the hood and the other into the space around the hood.

2. A filter comprising a sheet metal shell, a sheet metal hood secured substantially contiguous an end portion of the shell and of less width than the shell, a cartridge having end caps and supported at at least one end by said hood, inlet and outlet passages in the end of said shell adjacent the hood, one of said passages extending through the hood and the other into the space around the hood, a transverse channel formed in at least a portion of said hood and said other mentioned passage being connected with said channel.

3. A filter comprising a sheet metal shell, a filter cartridge supported adjacent each end thereof by the shell, at least one of said cartridge supports being slidable to permit relative movement between said cartridge and an end of the shell, a hood between the cartridge and an end wall of the shell, a radial channel formed in said hood, inlet and outlet passages one of which leads through the shell and hood to the cartridge and the other of which leads through the end of the shell into the channel formed in said hood and to the outside of said cartridge, said cartridge being of less width than the shell and spaced therefrom on at least one side, and a pressure relief valve in a wall of said channel for connecting said inlet and outlet passages and short circuiting said cartridge.

4. A filter having a shell, a hood, and a cartridge in said shell of less width than the shell and spaced therefrom on at least one side, inlet and outlet passages through one end of said shell, one of said passages being substantially axially located and the other eccentric thereto, inlet and outlet passages through the opposite end of said shell, one of which is substantially axial and the other eccentric, the eccentric passage at one end of the shell and the axial passage at the other end of said shell being both connected within the space between the cartridge and shell, the axial passage at one end and the eccentric passage at the other end of the shell being both connected to the inside of said cartridge, one end of said cartridge being supported by said hood, said hood having a radial channel between the axial passage and the space outside the filter cartridge, said hood also having a passage through it to the inside of said cartridge.

CHARLES H. CUNO.